(12) United States Patent
Gerlach

(10) Patent No.: US 8,104,268 B2
(45) Date of Patent: Jan. 31, 2012

(54) METHOD FOR OPERATING A METERING VALVE AND DEVICE FOR PERFORMING THE METHOD

(75) Inventor: Michael Gerlach, Waiblingen-Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 1026 days.

(21) Appl. No.: 10/583,054

(22) PCT Filed: Dec. 8, 2004

(86) PCT No.: PCT/EP2004/053336
§ 371 (c)(1),
(2), (4) Date: May 9, 2007

(87) PCT Pub. No.: WO2005/061866
PCT Pub. Date: Jul. 7, 2005

(65) Prior Publication Data
US 2009/0159132 A1 Jun. 25, 2009

(30) Foreign Application Priority Data
Dec. 19, 2003 (DE) .................................. 103 60 891

(51) Int. Cl.
*F01N 3/00* (2006.01)
(52) U.S. Cl. ................ 60/286; 60/274; 60/277; 60/295; 60/324
(58) Field of Classification Search .................... 60/274, 60/277, 286, 295, 303, 324
See application file for complete search history.

(56) References Cited

U.S. PATENT DOCUMENTS

| 5,709,080 | A | * | 1/1998 | Arora et al. ..................... 60/274 |
| 6,209,315 | B1 | * | 4/2001 | Weigl .............................. 60/274 |
| 6,442,932 | B1 | * | 9/2002 | Hofmann et al. ............... 60/274 |
| 6,918,245 | B2 | * | 7/2005 | Hirooka et al. ................. 60/289 |
| 7,067,319 | B2 | * | 6/2006 | Wills et al. ..................... 436/37 |
| 7,337,607 | B2 | * | 3/2008 | Hou et al. ....................... 60/274 |
| 2003/0033799 | A1 | | 2/2003 | Scheying |
| 2009/0113875 | A1 | * | 5/2009 | Miyake .......................... 60/277 |

FOREIGN PATENT DOCUMENTS

| DE | 101 39 142 | 2/2003 |
| EP | 1 176 295 | 1/2002 |
| JP | 2002-147223 | 5/2002 |
| JP | 2002-242663 | 8/2002 |
| JP | 2002 242780 | 8/2002 |
| JP | 2002 147223 | 9/2002 |

* cited by examiner

Primary Examiner — Tu Nguyen
(74) Attorney, Agent, or Firm — Kenyon & Kenyon LLP

(57) ABSTRACT

A method for operating a metering valve and a device for performing the method, providing for diagnosis of the metering valve which defines a flow rate of a reagent to be introduced into an exhaust gas area of an internal combustion engine. The diagnosis is performed on the basis of an analysis of a measure for the flow rate during a diagnosis time. According to a first embodiment, after a diagnosis start signal has occurred with the metering valve closed, the reagent is brought to a predefined diagnosis starting pressure via a pump; the metering valve is then set at a predefined flow rate and the pressure difference occurring during the diagnosis time is analyzed. According to another embodiment, the amount of reagent delivered by the metering valve during the diagnosis time into a graduated beaker is analyzed.

31 Claims, 2 Drawing Sheets

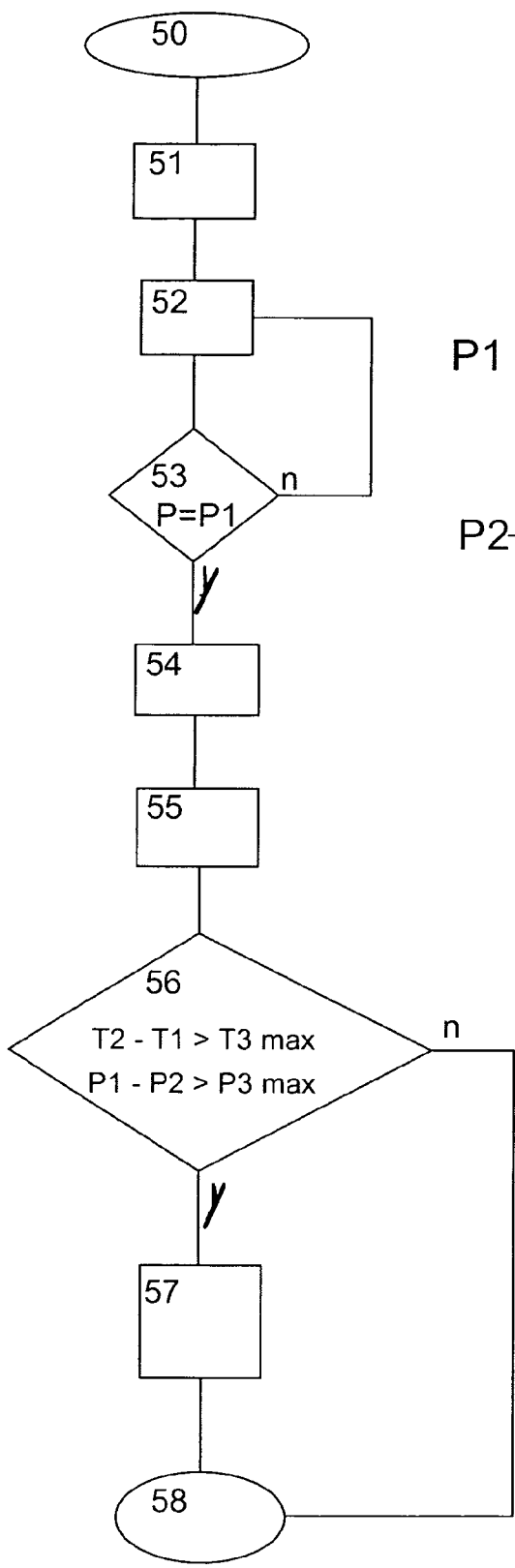
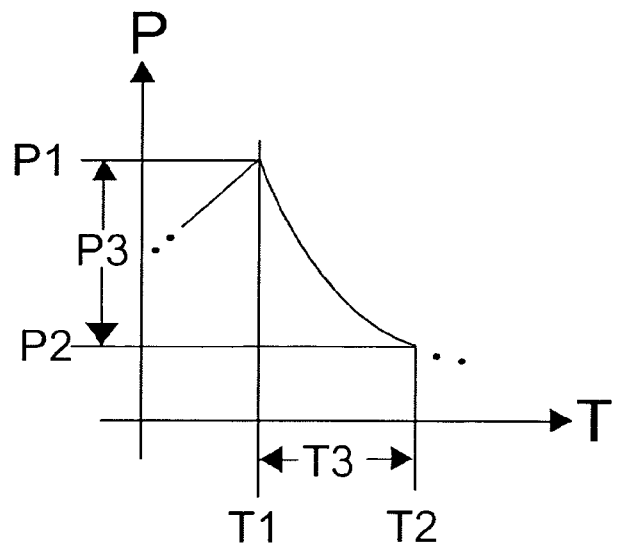
Fig.3
Fig.2

METHOD FOR OPERATING A METERING VALVE AND DEVICE FOR PERFORMING THE METHOD

BACKGROUND INFORMATION

German Patent Application No. DE 101 39 142 describes an exhaust gas aftertreatment unit for an internal combustion engine in which the concentration of a urea-water solution in a tank is determined to permit accurate metering of the urea-water solution into the exhaust gas area of the internal combustion engine. The urea-water solution is a reagent that acts as a reducing agent in an SCR catalytic converter, where it reduces the nitrogen oxides contained in the exhaust of the internal combustion engine. In a first reaction step, the urea present in the urea-water solution reacts with water (undergoing hydrolysis) to form ammonia and carbon dioxide. In a second reaction step, NO and $NO_2$ react with ammonia to form nitrogen and water. The flow rate of the urea-water solution is adjusted by a metering valve and must not exceed an upper limit or drop below a lower limit. If it drops below the lower limit, the SCR catalytic converter is ineffective, and if it exceeds the upper limit, a breakthrough of ammonia occurs.

An object of the present invention is to provide a method for operating a metering valve and a device for performing the method, making it possible to maintain a specified flow rate of a reagent to be introduced into an exhaust gas area of an internal combustion engine.

SUMMARY OF THE INVENTION

In a procedure according to the present invention, a measure of the flow rate of a reagent through the metering valve is analyzed during a measurement time as part of a diagnosis. The procedure according to the present invention ensures the accuracy of the metered addition of reagent into the exhaust gas area of an internal combustion engine over the entire service life of the metering valve. The diagnosis thus contributes toward compliance with the exhaust limits during the entire operating period of the internal combustion engine.

According to a first embodiment, the diagnosis is triggered by a start signal supplied by a diagnosis device. The first embodiment is suitable for performing the diagnosis as part of an inspection of the internal combustion engine which may be performed at a service shop, for example. The measure of the flow rate is determined during a specified measurement time during which the reagent is collected in a graduated beaker. On the basis of a comparison with a reference value which is determined when the metering value is new, for example, and stored in a memory of a control unit, it is possible to decide whether it is sufficient to merely take into account an adjustment value or if the metering valve must be replaced.

According to another embodiment, a pressure difference is used as the measure of the flow rate through the metering valve. With this measure, it is possible to perform a diagnosis during downtime and also during operation of the internal combustion engine, even without time spent in a service shop. According to one embodiment of the diagnosis test, after a diagnosis start signal has occurred, the reagent is brought to a predefined starting pressure by a pump while the metering valve is closed; the metering valve is then set at a predefined flow rate and the pressure difference occurring due to the pressure drop during the measurement time is analyzed.

According to an embodiment of this method, the pressure difference is a fixedly predefined level, and a warning signal is supplied when the measurement time exceeds a predefined diagnosis time limiting value. According to an alternative embodiment, the diagnosis time is preset at a fixed value and a warning signal is delivered if the pressure difference exceeds a predefined pressure difference limiting value.

The procedure according to the present invention may be used to adapt a diagnosis signal delivered by a metering control unit on the metering valve as a function of the diagnosis result. Wear on the metering valve may be compensated within certain limits through this measure, so that replacement of the metering valve may be postponed.

The diagnosis may be initiated, for example, by a diagnosis start signal supplied by an internal combustion engine control unit. An after-running control unit is advantageously provided, supplying a diagnosis start signal after the internal combustion engine has been turned off, so that the diagnosis may take place independently of operation of the internal combustion engine. The diagnosis start signal may also be supplied in particular by a freeze cycle counter that counts the number of freeze cycles of the system, in particular of the metering valve. The diagnosis may then be performed in particular after freezing of the reagent, which is critical for the metering valve.

BRIEF DESCRIPTION OF THE DRAWINGS

FIG. 2 shows a flow chart of a method, and FIG. 3 shows a pressure curve over time.

DETAILED DESCRIPTION

Figure 1:
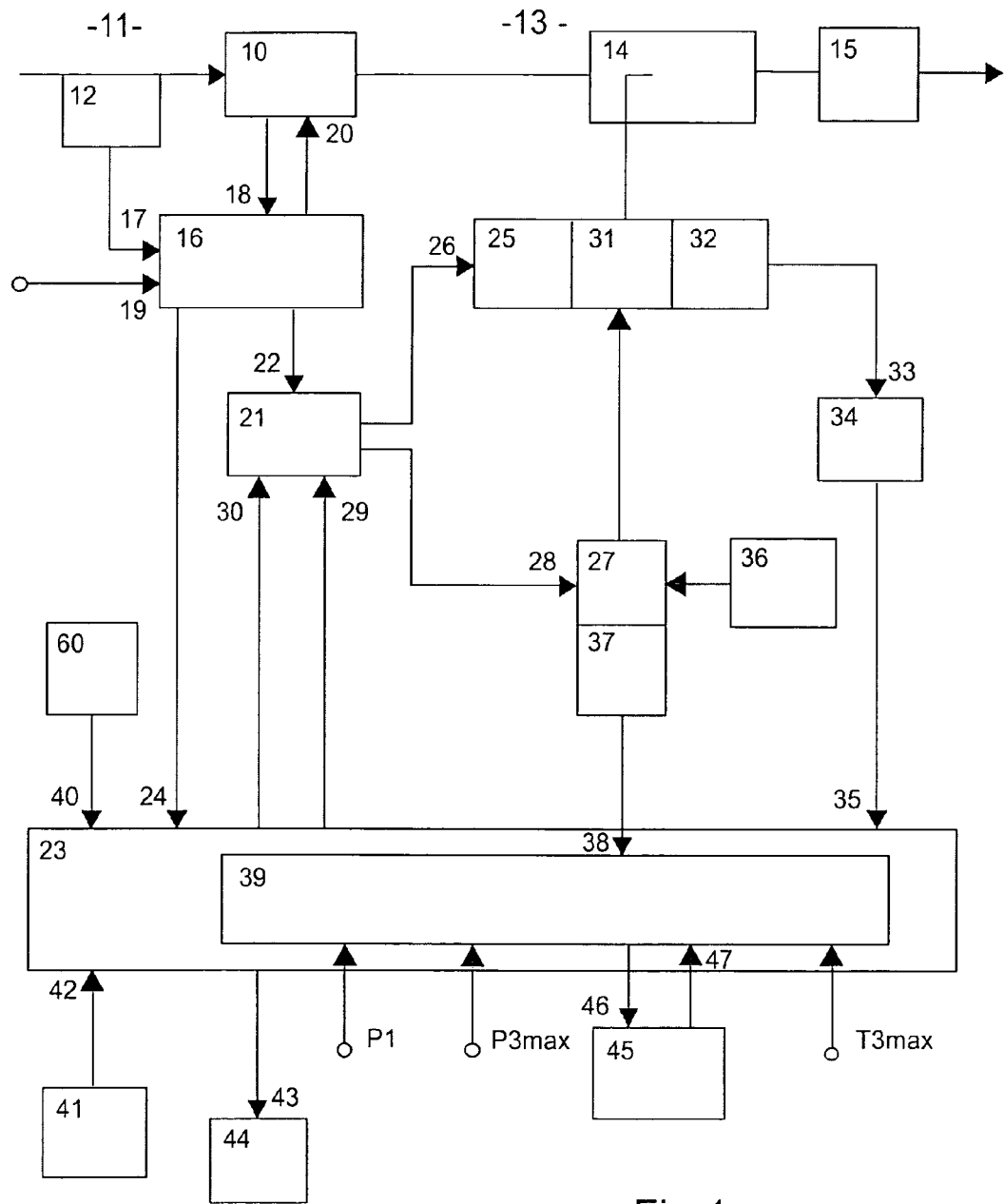
FIG. 1 shows an internal combustion engine within whose environment a method according to the present invention is performed for diagnosing a metering valve.

FIG. 1 shows an internal combustion engine 10 having an air sensor 12 in its intake area 11, a metering device 14 and an emission control unit 15 in the exhaust gas area 13. Air sensor 12 delivers an air sensor signal 17 to an internal combustion engine control unit 16. Internal combustion engine control unit 16 also receives a rotational speed signal 18 supplied by internal combustion engine 10 and a setpoint signal 19.

Internal combustion engine control unit 16 delivers a fuel signal 20 to internal combustion engine 10, a metering signal 22 to a metering control unit 21 and a first diagnosis start signal 24 to a diagnosis control unit 23.

Metering control unit 21 supplies a metering valve signal 26 to a metering valve triggering unit 25 and a pump signal 28 to a pump 27. Metering control unit 21 also receives a diagnosis signal 29 and a connection signal 30 from diagnosis control unit 23.

Metering valve triggering unit 25 is assigned to a metering valve 31, which is connected to both metering device 14 and pump 27. A temperature sensor 32 provided for metering valve 31 delivers a temperature signal 33 to a freeze cycle counter 34. Freeze cycle counter 34 delivers a second diagnosis start signal 35 to diagnosis control unit 23.

Pump 27 is connected to a reagent tank 36. A pressure sensor 37 assigned to pump 27 delivers a pressure signal 38 to a signal analyzer 39.

Signal analyzer 39 is contained in diagnosis control unit 23. Diagnosis control unit 23 also receives a third diagnosis start signal 40 from an after-running control unit 60 and a fourth diagnosis start signal 42 from a diagnosis device 41.

Signal analyzer 39 delivers a warning signal 43 to a signal device 44. Signal analyzer 39 receives a diagnosis start pressure P1, a pressure difference limiting value P3max and a diagnosis time limiting value T3max. A timer 45 receives a timer start signal 46 from signal analyzer 39 and delivers a time signal 47 to signal analyzer 39.

FIG. 2 shows a flow chart of the method according to the present invention. After a start 50, metering valve 31 is closed in a first function block 51. In a second function block 52, pump 27 is turned on. A first query 53 determines whether diagnosis start pressure P1 has been reached. If this is the case, then in a third function block 54, pump 27 is turned off. Accordingly, metering valve 27 is opened with a predefined cross section in a fourth function block 55. A second query 56 determines either whether a diagnosis time T has exceeded diagnosis time limiting value T3max or whether a pressure P has exceeded pressure difference limit P3max. If this is the case, warning signal 43 is then supplied in a fifth function block 57. End 58 of the diagnosis is then reached.

FIG. 3 shows a curve for pressure P as a function of time T. Pressure P increases in a time range before diagnosis starting time T1 until reaching diagnosis starting pressure P1 at diagnosis starting time T1. During a diagnosis time T3, pressure P drops to a diagnosis end pressure P2. A pressure difference P3 occurs between diagnosis starting pressure P1 and diagnosis end pressure P2.

The method according to the present invention operates as described below.

Emission control unit 15 which is situated in exhaust gas area 13 of internal combustion engine 10 reduces at least one exhaust component such as soot or nitrogen oxides. Emission control unit 15 may therefore be designed, for example, as a filter or as a catalytic converter. It is assumed below that emission control unit 15 is provided for reducing nitrogen oxides and is designed as an SCR (selective catalytic reaction) catalytic converter. In the SCR catalytic converter known from the related art, a urea-water solution, which is stored in reagent tank 36, is needed as the reagent.

The urea-water solution is a reagent which acts as a reducing agent in an SCR catalytic converter for the nitrogen oxides contained in the exhaust gas of the internal combustion engine. In a first reaction step, the urea contained in the urea-water solution is reacted (hydrolyzed) with water to form ammonia and carbon dioxide and in a second reaction step, NO and $NO_2$ are finally reacted with ammonia to form nitrogen and water. The concentration of the urea-water solution in the exhaust gas must not exceed an upper limit or drop below a lower limit. If it drops below the lower limit, the SCR catalytic converter is ineffective, and if it exceeds the upper limit, there is a breakthrough of ammonia.

To adjust the flow rate, i.e., flow quantity per unit of time, pump 27 and metering valve 31 are provided. Pump 27 brings the urea-water solution to a predefined pressure and metering valve 31 is adjusted by metering valve triggering unit 25 at a predefined flow cross section.

The flow rate to be preselected is a function of the concentration of nitrogen oxides and the exhaust mass flow in exhaust gas area 13 of internal combustion engine 10. Internal combustion engine control unit 16 may estimate these values on the basis of air sensor signal 17 and/or fuel signal 20, for example. If necessary, rotational speed signal 18 may also be taken into account. In addition, setpoint signal 19 which represents an intended torque may also be included. Internal combustion engine control unit 16 specifies metering signal 22 to be delivered to metering control unit 21. Metering control unit 21 determines metering valve signal 26 which provides metering valve triggering unit 25 with information regarding the extent to which metering valve 31 is to be opened. Metering control unit 21 also controls pump 27 via pump signal 28.

Metering valve 31 is subject to wear due to aging. Metering valve 31 may be exposed to mechanical stresses which occur in particular in freezing and/or thawing of the reagent. If a urea-water solution is used as the reagent, the freezing point is approximately −11° C. Therefore, a diagnosis which is performed by diagnosis control unit 23 is provided for checking on metering valve 31.

The diagnosis may be triggered by internal combustion engine control unit 16 via first diagnosis start signal 24. First diagnosis start signal 24 may be supplied, for example, in an operating state in which internal combustion engine 10 generates nitrogen oxide in small amounts, e.g., when idling.

According to a particularly advantageous measure, the number of freeze cycles of metering valve 31 is detected by freeze cycle counter 34, which prompts a diagnosis via second diagnosis start signal 35, either after each freezing or after a preselected number of freeze events. Freeze cycle counter 34 compares the temperature of metering valve 31 detected by temperature sensor 32 with a preselected threshold value which corresponds to the freezing point of the reagent.

After-running control unit 60, which is still active after internal combustion engine 10 has been turned off, may prompt the diagnosis via third diagnosis start signal 40. With this measure it is possible to perform the diagnosis without influence by the exhaust gas of internal combustion engine 10. After-running control unit 60 is preferably contained in internal combustion engine control unit 16.

The diagnosis of metering valve 31 may also be provided as part of a repair visit to the service shop. The diagnosis may be triggered by an operator using diagnosis device 41, which delivers fourth diagnosis start signal 42 to diagnosis control unit 23.

The diagnosis procedure will now be explained with reference to the flow chart illustrated in FIG. 2 and the curve of pressure P as a function of time T as shown in FIG. 3.

Start 50 is reached by the occurrence of the first, second, third and/or fourth diagnosis start signals 24, 35, 40, 42. Metering valve 31 is closed in first function block 51. Diagnosis control unit 23 prompts metering valve 31 to be closed via diagnosis signal 29 which is sent to metering control unit 21.

Pump 27 is turned on in subsequent second function block 52. This procedure is also triggered by the occurrence of diagnosis signal 29. Diagnosis starting time T1 shown in FIG. 1 is reached when it is found in first query 53 that pressure P has reached diagnosis starting pressure P1. Diagnosis starting pressure P1 is sent to signal analyzer 39 as a preselected threshold value. Pressure sensor 37 detects that diagnosis starting pressure P1 has been reached and then delivers pressure signal 38 to signal analyzer 39. When diagnosis starting pressure P1 is reached, pump 27 is turned off in subsequent third function block 54 and metering valve 31 is opened over a predefined cross section in following fourth function block 55.

After opening metering valve 31, a drop in pressure occurs in diagnosis time T3 between diagnosis starting time T1 and diagnosis end time T2, this pressure drop being given by pressure difference P3. To determine diagnosis time T3, timer 45 is provided and is started at diagnosis starting time T1 via timer start signal 46 from signal analyzer 39 on reaching diagnosis starting pressure P1. Timer 45 sends diagnosis time T3 back to signal analyzer 39 with time signal 47.

Pressure difference P3 may be used as a measure of the flow rate. The advantage of this measure is that it does not require any intervention in the device. Signal analyzer 39 may perform the diagnosis in two ways. According to a first exemplary embodiment, pressure difference P3 may be fixedly predefined and diagnosis time T3 may be compared with preselected diagnosis time limiting value T3max. According to another exemplary embodiment, diagnosis time T3 may be fixedly predefined and pressure difference P3 compared with preselected pressure difference limit P3max. The comparisons are performed in second query 56. If one or the other limit T3max, P3max has not been exceeded, the procedure jumps directly to diagnosis end 58. If a limiting value T3max, P3max has been exceeded, the procedure jumps to fifth function block 57 in which output of warning signal 43 is triggered. Warning signal 43 prompts signal unit 44 to release an acoustic and/or optical signal, for example, indicating to an operator that a service facility should be visited to test metering valve 31 and replace it, if necessary.

According to an expedient embodiment, correction signal 30 is delivered to metering control unit 21 as a function of the diagnosis result. Correction signal 30 allows compensation of deviations found in the flow rate of metering valve 31 which are within the tolerance before reaching limiting value T3max, P3max. In ascertaining metering valve signal 26 as a function of metering signal 22, metering control unit 21 may also take into account correction signal 30 and correct the triggering of metering valve 31 adaptively.

The diagnosis may also be made volumetrically during a visit to a service shop. In this case, the diagnosis is triggered by diagnosis device 41 with fourth diagnosis start signal 42. The quantity flowing through metering valve 31 during diagnosis time T3 is collected in a graduated beaker. By comparing the collected amount with a reference value, a change, if any, may be ascertained. The reference value may be ascertained and stored in a memory of internal combustion engine control unit 16, for example, when metering valve 31 is new. In this exemplary embodiment, correction signal 30 may be supplied by a manual intervention measure for adaptation of the metering quantity of reagent within preselected limits when there are deviations in the setpoint from the actual value. If the deviation between setpoint and actual value exceeds a predefined limit, metering valve 31 may have to be replaced, if necessary.

What is claimed is:

1. A method for operating a metering valve which sets a flow rate of a reagent to be introduced into an exhaust gas area of an internal combustion engine, the method comprising:
   providing a diagnosis of the metering valve including an analysis of a measure of a flow rate on the basis of a pressure difference during a diagnosis time;
   after an occurrence of a diagnosis start signal, bringing the reagent to a predefined diagnosis start pressure while the metering valve is kept closed;
   then setting the metering valve to an open position for providing a predefined flow rate;
   fixedly predefining the diagnosis time; and
   supplying a warning signal when the pressure difference exceeds a predefined pressure difference limit during the diagnosis time.

2. The method according to claim 1, further comprising providing an adaptation of a metering valve signal delivered by a metering control unit to the metering valve during metering operation as a function of one of (a) the ascertained measure for the flow rate, and (b) the pressure difference measures in the predefined diagnosis time.

3. The method according to claim 1, further comprising providing an adaptation of a metering valve signal delivered by a metering control unit to the metering valve during metering operation as a function of the pressure difference measured in the predefined diagnosis time.

4. The method according to claim 1, wherein the start signal includes at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

5. The method according to claim 1, further comprising:
   starting the diagnosis with the start signal, which triggers a diagnosis control unit; and
   analyzing an amount of reagent dispensed by the metering valve during the diagnosis time and collected in a graduated breaker.

6. The method according to claim 1, wherein the setting of the metering valve at a predefined flow rate includes opening the metering valve.

7. A method for operating a metering valve which sets a flow rate of a reagent to be introduced into an exhaust gas area of an internal combustion engine, the method comprising:
   providing a diagnosis of the metering valve including an analysis of a measure of a flow rate on the basis of a pressure difference during a diagnosis time; wherein the providing includes starting the diagnosis with a diagnosis start signal, which triggers a diagnosis control unit;
   after an occurrence of a diagnosis start signal, bringing the reagent to a predefined diagnosis start pressure while the metering valve is kept closed;
   then setting the metering valve at a predefined flow rate;
   analyzing the pressure difference occurring during the diagnosis time; and
   analyzing an amount of reagent dispensed by the metering valve during the diagnosis time and collected in a graduated breaker.

8. The method according to claim 7, further comprising providing an adaptation of a metering valve signal delivered by a metering control unit to the metering valve during metering operation as a function of the ascertained measure for the flow rate.

9. The method according to claim 7, further comprising providing an adaptation of a metering valve signal delivered by a metering control unit to the metering valve during metering operation as a function of the pressure difference.

10. The method according to claim 7, wherein the start signal includes at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

11. The method according to claim 1, wherein the predefined diagnosis start pressure has a predefined pressure valve.

12. A method for operating a metering valve which sets a flow rate of a reagent to be introduced into an exhaust gas area of an internal combustion engine, the method comprising:
   providing a diagnosis of the metering valve including an analysis of a measure of a flow rate on the basis of a pressure difference during a diagnosis time;
   after an occurrence of a diagnosis start signal, bringing the reagent to a predefined diagnosis start pressure while the metering valve is kept closed;
   then setting the metering valve at a predefined flow rate;
   fixedly predefining the pressure difference; and
   providing a warning signal when the diagnosis time exceeds a predefined diagnosis time limit.

13. The method according to claim 12, further comprising providing an adaptation of a metering valve signal delivered by a metering control unit to the metering valve during metering operation as a function of the ascertained measure for the flow rate.

14. The method according to claim 12, further comprising providing an adaptation of a metering valve signal delivered by a metering control unit to the metering valve during metering operation as a function of the pressure difference.

15. The method according to claim 12, wherein a start of the diagnosis is triggered by at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

16. The method according to claim 12, further comprising:
starting the diagnosis with the start signal, which triggers a diagnosis control unit; and
analyzing an amount of reagent dispensed by the metering valve during the diagnosis time and collected in a graduated breaker.

17. A device for operating a metering valve which sets a flow rate of a reagent to be introduced into an exhaust gas area of an internal combustion engine, the device comprising a diagnosis control unit for performing the following:
providing a diagnosis of the metering valve including an analysis of a measure of a flow rate on the basis of a pressure difference during a diagnosis time;
after an occurrence of a diagnosis start signal, bringing the reagent to a predefined diagnosis start pressure while the metering valve is kept closed;
then setting the metering valve at a predefined flow rate;
fixedly predefining the pressure difference; and
providing a warning signal when the diagnosis time exceeds a predefined diagnosis time limit.

18. The device according to claim 17, wherein the device includes an arrangement configured to provide an adaptation of a metering valve signal delivered by a metering control unit to the metering valve during metering operation as a function of the ascertained measure for the flow rate.

19. The device according to claim 17, wherein the device includes an arrangement configured to provide an adaptation of a metering valve signal delivered by a metering control unit to the metering valve during metering operation as a function of the pressure difference.

20. The device according to claim 17, wherein a start of the diagnosis is triggered by at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

21. The device according to claim 17, wherein the device is configured for starting the diagnosis with the start signal, which triggers the diagnosis control unit, and the diagnosis control unit is configured to analyze an amount of reagent dispensed by the metering valve during the diagnosis time and collected in a graduated breaker.

22. A device for operating a metering valve which sets a flow rate of a reagent to be introduced into an exhaust gas area of an internal combustion engine, the device comprising a diagnosis control unit for performing the following:
providing a diagnosis of the metering valve including an analysis of a measure of a flow rate on the basis of a pressure difference during a diagnosis time, the diagnosis control unit being triggered for a start of the diagnosis by a diagnosis start signal;
after an occurrence of a diagnosis start signal, bringing the reagent to a predefined diagnosis start pressure while the metering valve is kept closed;
then setting the metering valve at a predefined flow rate;
analyzing the pressure difference occurring during the diagnosis time; and
analyzing an amount of reagent dispensed by the metering valve during the diagnosis time and collected in a graduated breaker.

23. The device according to claim 22, wherein the device includes an arrangement configured to provide an adaptation of a metering valve signal delivered by a metering control unit to the metering valve during metering operation as a function of the ascertained measure for the flow rate.

24. The device according to claim 22, wherein the device includes an arrangement configured to provide an adaptation of a metering valve signal delivered by a metering control unit to the metering valve during metering operation as a function of the pressure difference.

25. The device according to claim 22, wherein a start signal includes at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

26. A device for operating a metering valve which sets a flow rate of a reagent to be introduced into an exhaust gas area of an internal combustion engine, the device comprising a diagnosis control unit for performing the following:
providing a diagnosis of the metering valve including an analysis of a measure of a flow rate on the basis of a pressure difference during a diagnosis time;
after an occurrence of a diagnosis start signal, bringing the reagent to a predefined diagnosis start pressure while the metering valve is kept closed;
then setting the metering valve to an open position for providing a predefined flow rate;
fixedly predefining the diagnosis time; and
supplying a waning signal when the pressure difference exceeds a predefined pressure difference limit during diagnosis time.

27. The device according to claim 26, wherein the device includes an arrangement configured to provide an adaptation of a metering valve signal delivered by a metering control unit to the metering valve during metering operation as a function of the ascertained measure for the flow rate.

28. The device according to claim 26, wherein the device includes an arrangement configured to provide an adaptation of a metering valve signal delivered by a metering control unit to the metering valve during metering operation as a function of the pressure difference measured in the predefined diagnosis time.

29. The device according to claim 26, wherein a start of the diagnosis is triggered by at least one of: (a) a first diagnosis start signal supplied by an internal combustion engine control unit, (b) a second diagnosis start signal supplied by a freeze cycle counter, (c) a third diagnosis start signal supplied by an after-running control unit, and (d) a fourth diagnosis start signal supplied by a diagnosis device.

30. The device according to claim 26, wherein the device is configured for starting the diagnosis with the start signal, which triggers the diagnosis control unit, and the diagnosis control unit is configured to analyze an amount of reagent dispensed by the metering valve during the diagnosis time and collected in a graduated breaker.

31. The device according to claim 26, wherein the setting of the metering valve at the predefined flow rate includes opening the metering valve.

* * * * *